（12） United States Patent
Pöschmann et al.

(10) Patent No.: US 11,190,371 B2
(45) Date of Patent: Nov. 30, 2021

(54) FIELDBUS COMPONENT WITH A SETTING ELEMENT FOR CONFIGURING DATA TRANSFER TO A CLOUD

(71) Applicant: Endress+Hauser Process Solutions AG, Reinach (CH)

(72) Inventors: Axel Pöschmann, Basel (CH); Michael Mayer, Oberwil (CH)

(73) Assignee: Endress+Hauser Process Solutions AG, Reinach (CH)

( * ) Notice: Subject to any disclaimer, the term of this patent is extended or adjusted under 35 U.S.C. 154(b) by 0 days.

(21) Appl. No.: 16/956,101

(22) PCT Filed: Nov. 14, 2018

(86) PCT No.: PCT/EP2018/081181
§ 371 (c)(1),
(2) Date: Jun. 19, 2020

(87) PCT Pub. No.: WO2019/120770
PCT Pub. Date: Jun. 27, 2019

(65) Prior Publication Data
US 2021/0105150 A1    Apr. 8, 2021

(30) Foreign Application Priority Data

Dec. 19, 2017   (DE) .................. 10 2017 130 517.3

(51) Int. Cl.
*H04L 12/40*    (2006.01)
*H04L 29/12*    (2006.01)
(Continued)

(52) U.S. Cl.
CPC .... *H04L 12/40013* (2013.01); *H04L 61/2061* (2013.01); *H04L 67/1097* (2013.01); *H04L 69/18* (2013.01)

(58) Field of Classification Search
CPC .............. H04L 69/18; H04L 12/40013; H04L 61/2061; H04L 67/1097; H01R 2201/04;
(Continued)

(56) References Cited

U.S. PATENT DOCUMENTS 6,947,389 B1 * 9/2005 Chen .................. G05B 19/4185
370/252
8,769,622 B2 * 7/2014 Chang .................... G06F 21/78
726/4
(Continued)

FOREIGN PATENT DOCUMENTS

CN       201117287 Y    9/2008
CN       104954242 A    9/2015
(Continued)

*Primary Examiner* — Chirag R Patel
(74) *Attorney, Agent, or Firm* — Mark A. Logan; Endress+Hauser (USA) Holding Inc.

(57) ABSTRACT

A fieldbus component of the present disclosure is configured to transfer data either in a first data transfer mode to a public cloud or in a second data transfer mode to a private cloud. The fieldbus component includes a setting element, which is selectively settable to a first setting or to a second setting. The fieldbus component is configured to transfer data in the first data transfer mode to the public cloud when the setting element is set to the first setting and to transfer data in the second data transfer mode to the private cloud when the setting element is set to the second setting.

15 Claims, 6 Drawing Sheets

(51) Int. Cl.
*H04L 29/08* (2006.01)
*H04L 29/06* (2006.01)

(58) Field of Classification Search
CPC ............... H05K 7/1472; H05K 7/1479; G05B 19/4185; G05B 2219/25014; G05B 2219/25428; G05B 2219/31121; G05B 2219/31135; G06F 13/4086
See application file for complete search history.

(56) References Cited

U.S. PATENT DOCUMENTS

| | | |
|---|---|---|
| 10,057,768 B1 * | 8/2018 | Furuichi ............. H04L 63/0838 |
| 10,148,493 B1 * | 12/2018 | Ennis, Jr. ................ G06F 9/541 |
| 2011/0145094 A1 | 6/2011 | Dawson et al. |
| 2012/0210037 A1 * | 8/2012 | Kiesel .................. H05K 7/1468 710/305 |
| 2012/0281708 A1 | 11/2012 | Chauhan et al. |
| 2014/0006580 A1 * | 1/2014 | Raghu ..................... H04L 41/22 709/223 |
| 2016/0150014 A1 * | 5/2016 | Yliaho .................... G06F 16/16 709/216 |
| 2017/0255723 A1 | 9/2017 | Asenjo et al. |
| 2017/0351226 A1 | 12/2017 | Bliss et al. |

FOREIGN PATENT DOCUMENTS

| | | |
|---|---|---|
| CN | 105723658 A | 6/2016 |
| CN | 107239329 A | 10/2017 |
| DE | 102013018596 A1 | 5/2015 |
| EP | 2801939 A1 | 11/2014 |

* cited by examiner

FIELDBUS COMPONENT WITH A SETTING ELEMENT FOR CONFIGURING DATA TRANSFER TO A CLOUD

CROSS-REFERENCE TO RELATED APPLICATIONS

The present application is related to and claims the priority benefit of German Patent Application No. 10 2017 130 517.3, filed on Dec. 19, 2017 and International Patent Application No. PCT/EP2018/081181, filed on Nov. 14, 2018, the entire contents of which are incorporated herein by reference.

TECHNICAL FIELD

The invention relates to a fieldbus component as well as to a fieldbus network having a fieldbus component. Moreover, the invention relates to a method for transferring data from a fieldbus component to a cloud.

BACKGROUND

In automation technology, field devices are often applied, which serve for registering and/or influencing process variables. Examples of such field devices are fill level measuring devices, mass flow measuring devices, pressure- and temperature measuring devices, etc., which, as sensors, register the corresponding process variables, fill level, flow, pressure, and temperature.

For logging, documenting and later evaluation of the data occurring within a fieldbus network, the fieldbus network, or individual field devices of the fieldbus network, can be provided with access to a cloud. In this way, selected parameters of the field devices as well as, for example, data for monitoring device state can be written to the cloud.

SUMMARY

Objects of the invention include a fieldbus component as well as a method for transferring data from a fieldbus component to a cloud, in the case of which the configuration of the data transfer to the cloud is simplified.

A fieldbus component corresponding to the forms of embodiment of the invention is designed to transfer data either in a first data transfer mode to a public cloud or in a second data transfer mode to a private cloud. In such case, the fieldbus component includes a setting element, which is selectively settable to a first setting or to a second setting. The fieldbus component is designed to transfer data in the first data transfer mode to the public cloud when the setting element is set to the first setting and to transfer data in the second data transfer mode to the private cloud when the setting element is set to the second setting.

In the case of fieldbus components, there is, in increasing measure, the requirement to store, in a cloud, registered measured values, parameter values and configuration data, as well as data for monitoring condition and for diagnosis of the device state of the fieldbus component. For this, there is the option of transferring the data to a public cloud and storing the data there. In a public cloud, the data of a large number of customers can be stored. In the case of some customers, it is, however, desired for purposes of data security that the data not be stored in a public cloud, but instead, in a private cloud. A private cloud can, for example, be accessed by only one customer or a selected group of customers. For example, cloud entries can be stored in a host of the company. For this, it is necessary either so to configure a fieldbus component that data to be transferred to a cloud are stored according to a first data transfer mode in the public cloud, or so to configure the fieldbus component that the data are transferred according to a second data transfer mode to a private cloud. It is provided that this setting of the transfer mode is effected by means of a setting element in the fieldbus component. Because of the setting element, which, can for example, be implemented as a switch or plug element, an especially easy and rapidly performed opportunity for configuring the fieldbus component is created. This enables, especially in larger production plants with a large number of fieldbus components, a fast configuring of whether the data is to be transferred to a public cloud or to a private cloud. Especially, it is, in the case of this solution, not necessary to configure the fieldbus component via an interface, such as, for example, Bluetooth or WLAN, by means of a device configuration software. Such a configuration via an interface by means of software is always perceived by customers as complex and inconvenient. Moreover, device configuration via such an interface represents a supplemental security risk, because each interface provides a potential security hole for an automation network and opens an attack route for unauthorized access. The simple hardware element, which can be set to at least two possible settings, has no software interface or other auxiliary means. In this way, the security of the fieldbus component is increased, since fewer interfaces need to be provided in the fieldbus component. A further advantage of the solution of the invention is a simpler integration in explosion protected surroundings, a simpler integration in surroundings, in which protection according to the protection class IP67 is required or in which particular dust- or hygiene requirements must be fulfilled. Instead of complex plug-in or interface solutions, a simple 1-bit setting element is provided.

In a preferred solution, the domain name of the private cloud, to which the data is to be transferred, is generated by means of a production schema provided for this, for example, using the local domain, in which the fieldbus component is installed. In the case of application of such a production schema, both the addressing of the public cloud as well as also the addressing of the private cloud are automatically performed by the field device, so that the user does not need to be concerned with the details of the configuration.

A fieldbus network corresponding to the forms of embodiment of the invention includes a fieldbus, a fieldbus component, such as above described, connected to the fieldbus as well as a connecting device connected to the fieldbus or a cloud server connected to the fieldbus.

A method corresponding to the forms of embodiment of the invention serves for transferring data from a fieldbus component to a cloud, wherein the fieldbus component is designed to transfer data to a cloud either in a first data transfer mode to a public cloud or in a second data transfer mode to a private cloud. The fieldbus component includes a setting element, which can be set selectively to a first setting or to a second setting. The method includes setting the setting element of the fieldbus component to a first setting or to a second setting, as well as transferring data to the public cloud, when the setting element is set to the first setting, or transferring data to the private cloud, when the setting element is set to the second setting.

BRIEF DESCRIPTION OF THE DRAWINGS

The invention will now be explained in greater detail based on examples of embodiments shown in the drawing, the figures of which show as follows.

DETAILED DESCRIPTION

In the case of field devices of automation technology, it is required in increasing measure that data be transferable from the field device to a cloud for storage there. The data to be stored can be, for example, parameter values and configuration data of the field device, registered measured values, data concerning device state, diagnostic data and/or results of a data evaluation. Such data can be written by the field device via a data connection, for example, a wireless data connection, to a public cloud. Many companies prefer, however, to store the data occurring in the field devices in a company cloud server, i.e. a private cloud, in order, in this way, as regards data security, to maintain better control of the data.

In view of these customer requirements, field devices should be so configurable that the cloud data occurring in the field device can be transferred selectively either to a public cloud or to a private cloud. In order to lessen the configuration effort, there is provided in the field device or on the field device a setting element, which has at least two setting options, wherein by means of this setting element it can be selected, whether the cloud data is to be transferred to a public cloud or to a private cloud. In such case, the setting element can, for example, be embodied as a hardware implemented switch- or configuration element, for example, as a dual in-line (DIP) switch and even as a plug-in jumper. In the following, the setting options of the setting element will be referred to with "true" and "false", wherein the setting element can, supplementally to these two setting options, have yet other setting options. The field device is designed in the case of the setting "true" to transfer the occurring cloud data to a public cloud and in the case of the setting "false" to transfer the cloud data to a private cloud.

Figure 1:
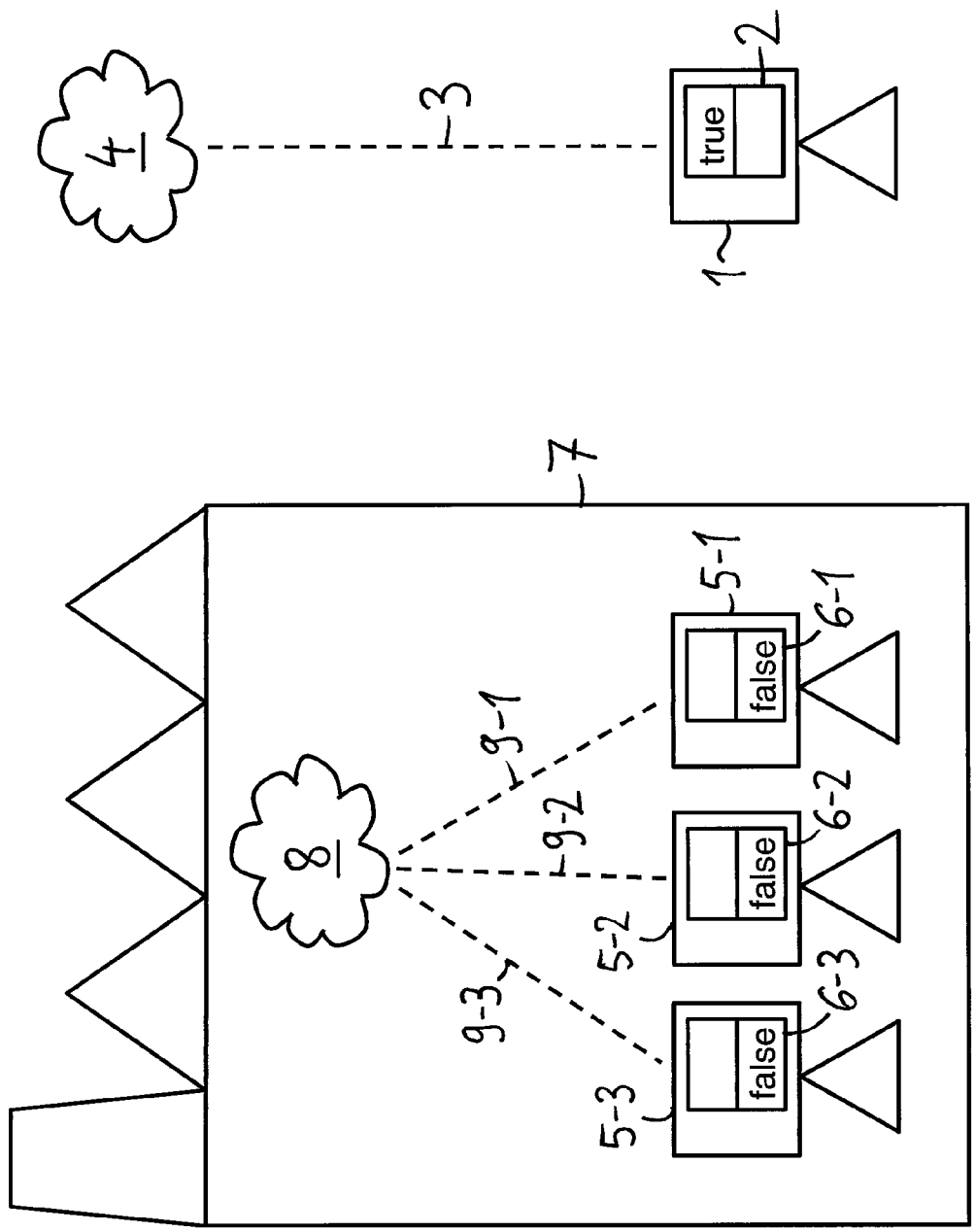
FIG. 1 shows operation of the hardware implemented setting element.

Shown in FIG. 1 is the operation of a field device, which is equipped with a setting element for configuring the data transfer to a cloud. Shown on the right side of FIG. 1 is a field device 1 having a hardware implemented setting element 2, wherein the setting "true" is selected. The field device 1 is designed in the case of this setting of the hardware implemented setting element 2 to transfer the cloud destined data according to a first data transfer mode via a data connection 3 to a public cloud 4. Data connection 3 can be, for example, a wireless data connection, for example, a WLAN connection or a mobile radio connection. The public cloud 4 can be addressed by the field device 1 via a fixedly predetermined domain name, such as, for example, "endresscloud.com", wherein this domain name provided for data transfer to the public cloud 4 is stored in the field device 1.

Shown on the left side of FIG. 1 are three field devices 5-1, 5-2 and 5-3, each of which is equipped with a hardware implemented setting element 6-1, 6-2 and 6-3. In the case of the three shown field devices 5-1, 5-2, 5-3, they can be, for example, field devices of an automation network within a plant 7. By means of the hardware implemented setting elements 6-1, 6-2 and 6-3, the data transfer mode to a cloud can be selected for each of the field devices. In the case of the illustrated example, the setting "false" is selected for each of the three setting elements 6-1, 6-2, 6-3. In the case of the setting "false", the field devices 5-1, 5-2 and 5-3 are configured for data transfer of the cloud data to a private cloud 8. The field devices 5-1, 5-2, 5-3 are designed in the case of the setting "false" of the setting elements 6-1, 6-2, 6-3 to transfer the occurring cloud data via data connections 9-1, 9-2, 9-3 to the private cloud 8. The data connections 9-1, 9-2 and 9-3 can be, for example, data connections provided especially for data transfer to the private cloud 8, for example, wireless data connections. Alternatively thereto, the cloud data can be transferred from the field devices 5-1, 5-2, 5-3, for example, via a fieldbus network to a connecting device or to a cloud server, so that the data connections 9-1, 9-2, 9-3 can be implemented in the form of fieldbus connections. The private cloud 8 can, in such case, be addressed via a local domain name, which is used within the plant 7, for example, via the local domain name "exampleCompany.de". The private cloud 8 could then be addressed, for example, via the domain name, "endresscloud.exampleCompany.de". Preferably, the local domain name required for addressing the private cloud 8 is produced in the field devices 5-1, 5-2 and 5-3 using a predetermined formation schema.

Figure 2:
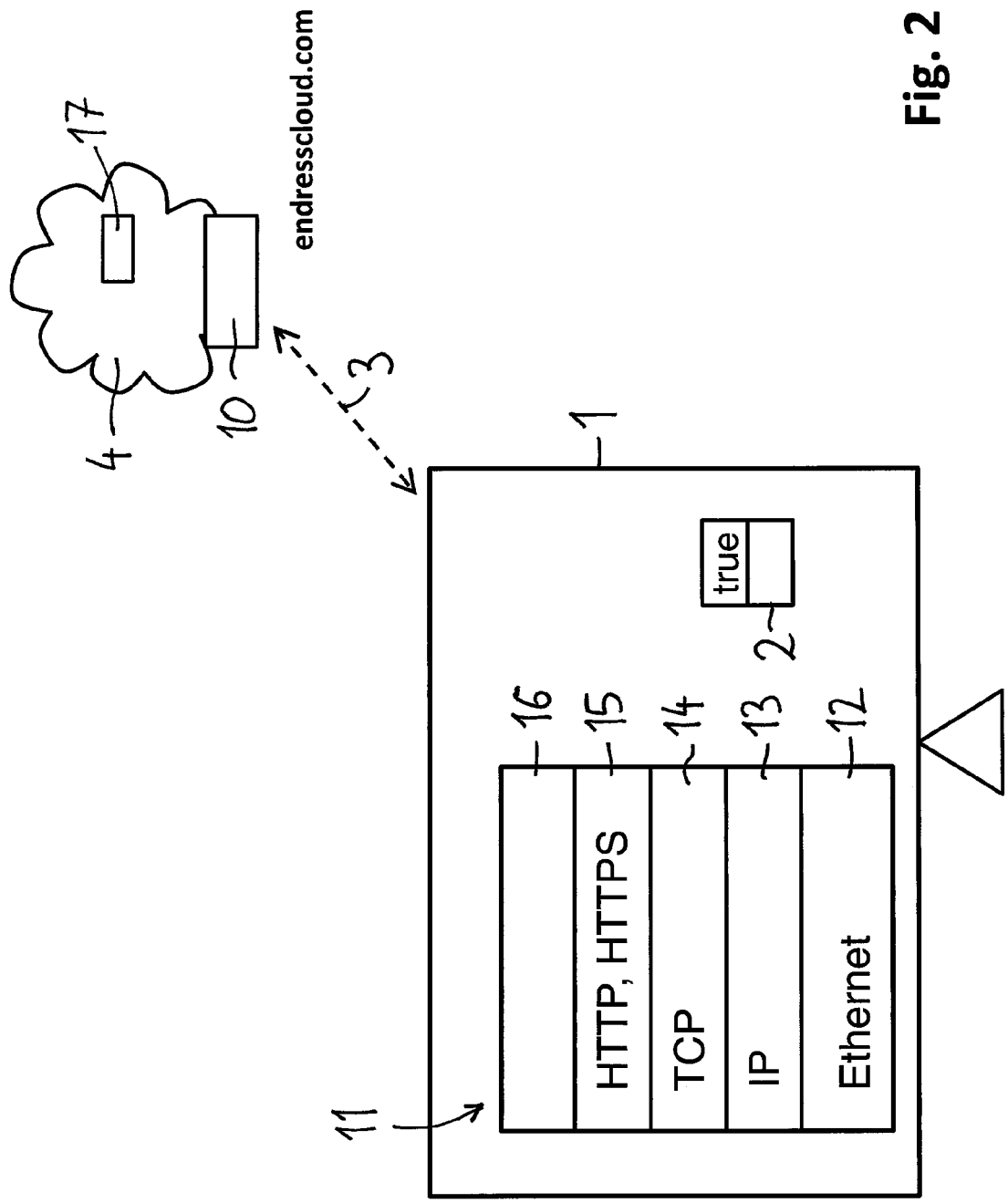
FIG. 2 shows a field device, which transfers cloud data to a public cloud in a first data transfer mode.

The field device 1 shown in FIG. 2 is enlarged. The hardware implemented setting element 2 is set to the value "true". Because of the setting "true" of the setting element 2, the data transfer mode of the field device 1 is so set for the data to be written to the cloud that the data to be transferred are transferred from the field device 1 to the public cloud 4. In such case, accessing database operations of the public cloud 4 occurs via a programming interface 10 of the cloud 4, which is also referred to as "cloud server API". Via the programming interface 10 of the public cloud 4, database services provided by the public cloud 4 can be accessed. In such case, the database services provided by the public cloud 4 can especially be accessed by means of the database operations known as CRUD operations, wherein the acronym "CRUD" stands for "Create, Read, Update, Delete". The CRUD operations comprise inserting ("Create") an entry in the public cloud 4, the read-out ("Read") of an entry, the updating ("Update") of an entry as well as the deleting ("Delete") of an entry in the public cloud 4. In such case, the entry can be a record, or a part of the record. Moreover, the cloud services can, however, also comprise other, differently structured or additional cloud services.

For producing requests for database services directed to the public cloud 4, the field device 1 contains a protocol stack 11, provided preferably an HTTP- or HTTPS protocol stack. The protocol stack 11 includes an Ethernet layer 12, an IP layer 13, a TCP layer 14 as well as an HTTP- or HTTPS layer 15. Implemented above the HTTP- or HTTPS layer 15 is an application-specific layer 16, which is provided for requesting the cloud services. Defined in this application-specific layer 16 are the above mentioned CRUD operations, thus, the database operations required for addressing the cloud services. By means of the CRUD operations, entries in the public cloud 4 can be inserted, read-out, modified and deleted. Preferably used for the CRUD operations in the application-specific layer 16 are HTTP commands such as GET and POST. Moreover, there are defined in the application-specific layer 16 data objects, which are required for accessing entries of the public cloud 4, especially, for example, data objects for assets, manufacturers and device types as well as linkages between these data objects. Besides the basic database operations and the data objects, at least one flow diagram can be specified in the application-specific layer to provide a sequence of operations, which must be followed for accessing cloud services. Thus, it is possible, for example, to provide that before inserting a new entry for a fieldbus component, it must be checked, whether an entry for this fieldbus component is already in the public cloud 4. Only after, corresponding to this flow diagram, it has been verified that such an entry is still not present, can the desired entry be inserted in the next step.

If the setting element 2 is set to the value "true", the request produced by the protocol stack 11 for a database operation is addressed to the domain name of the public cloud 4, wherein this domain name of the public cloud 4 is established, for example, by the manufacturer of the field device 1 and can be stored in the field device 1. In the case of field devices of the firm, Endress+Hauser, for example, "endresscloud.com" is used as domain name of the public cloud 4. The requests produced by the protocol stack 11 for database services are addressed to the domain names "endresscloud.com" of the public cloud 4, transferred via the data connection 3 to the programming interface 10 of the public cloud 4 and processed further in the public cloud 4. In such case, the domain name "endresscloud.com" is converted by means of a name server, or DNS server, into the IP-address 17 of the public cloud 4.

Figure 3:
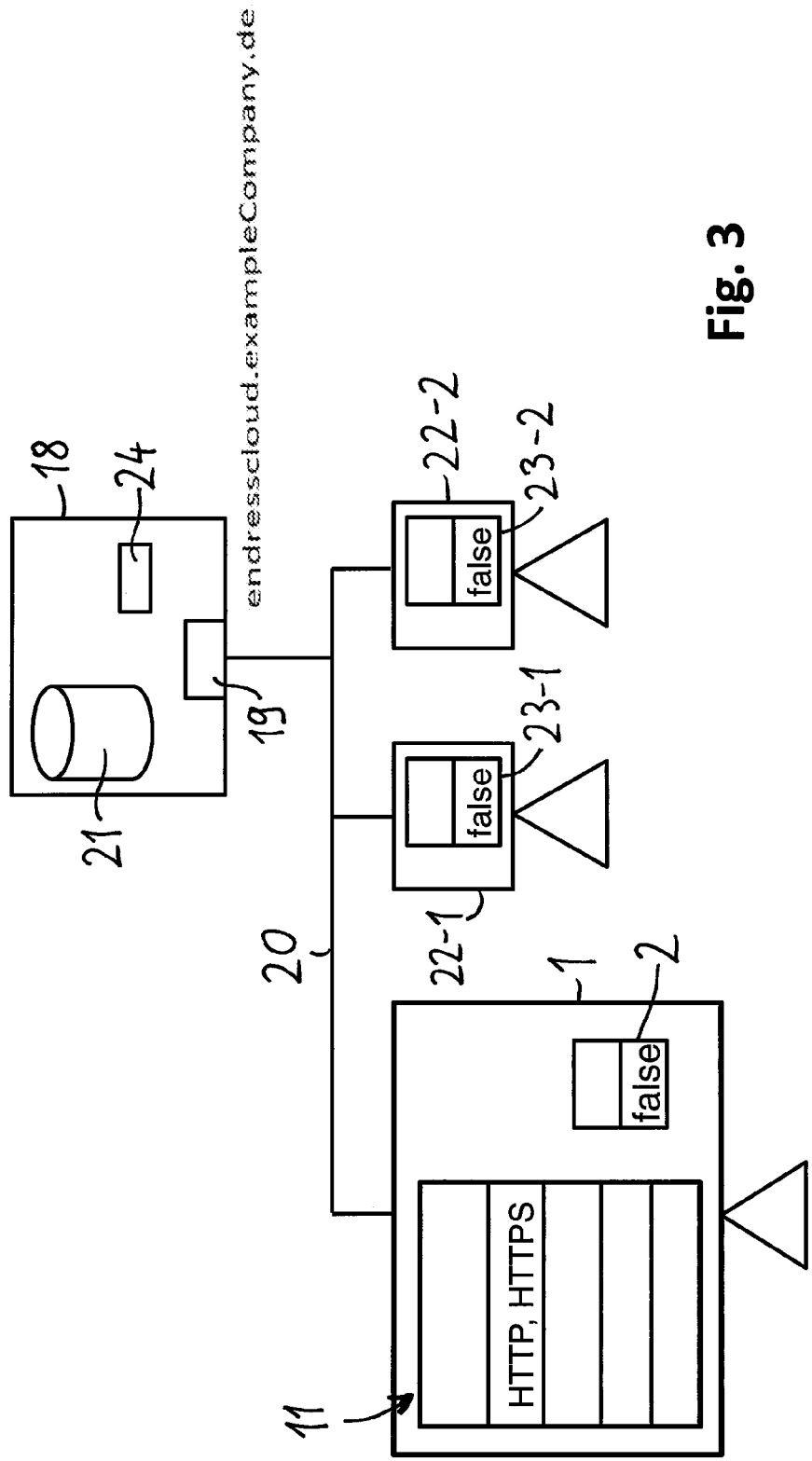
FIG. 3 shows a field device, which transfers cloud data via a fieldbus to a cloud server in a second data transfer mode.

Shown in FIG. 3 is the field device 1 yet again, wherein the setting element 2 is now, however, set to the value "false". In this way, there is established for the data to be transferred to the cloud a data transfer mode, according to which these data are transferred to a private cloud. The requests for database operations of the private cloud are produced again with the protocol stack 11, which has already been described in conjunction with the discussion of FIG. 2. Thus, in the Examples shown in FIGS. 2 and 3, the requests to the public cloud 4 and to the private cloud are produced with one and the same protocol stack 11, which preferably can be embodied as an HTTP- or HTTPS protocol stack. Alternatively thereto, also different protocol stacks can be provided for requests to the public cloud and for requests to the private cloud, this being described below.

A database request produced by the field device 1 is transferred via a data connection to a cloud server 18, wherein the data transfer in the case of the example illustrated in FIG. 3 occurs via a fieldbus 20. The different database services can be requested via the programming interface 19 of the cloud server 18. At least one data memory 21 is provided in the cloud server 18 for storing the cloud entries.

In the case of the example illustrated in FIG. 3, the data transfer between the field device 1 and the cloud server 18 occurs via the fieldbus 20, to which both field device 1 as well as also the cloud server 18 are connected. Moreover, other field devices 22-1, 22-2 can be connected to the fieldbus 20. In the case of the example illustrated in FIG. 3, these field devices 22-1, 22-2 are likewise, in each case, equipped with a setting element 23-1, 23-2 for selection of the data transfer mode. These setting elements 23-1, 23-2 are set, in each case, to the value "false", so that both the field device 22-1 as well as also the field device set 22-2 transfer occurring cloud data to the cloud server 18 and, thus, to the private cloud. Within the particular network, in the case of FIG. 3, thus, within the fieldbus network, the cloud server 18 is associated with a cloud name of the private cloud, with which the cloud server 18 can be contacted within the local domain. In a first option, this cloud name of the cloud server 18 could be selected without restriction. In such case, it would, however, be necessary to save the cloud name earlier in each of the field devices 1, 22-1 and 22-2, in order that such field devices requests for cloud services can be transferred to the cloud server 18.

Advantageously, however, the cloud name, with which the cloud server 18 is addressable within the local domain, is produced by means of a previously established formation schema. Within the local domain "exampleCompany.de", the cloud server 18 could, for example, have the cloud name "endresscloud.exampleCompany.de", which is composed of the name component "endresscloud", a dot used as separation character and the local domain name "exampleCompany.de". This cloud name is used by each of the field devices 1, 22-1 and 22-2 for the requests for cloud services. Because of the predetermined formation schema of the cloud name "endresscloud.exampleCompany.de", this cloud name can be derived in simple manner by each of the field devices 1, 22-1 and 22-2, so that it is not necessary to store this cloud name earlier in each of the field devices. When a field device signs into a particular local network, for example, into an industrial Ethernet network, then the DHCP server of the network assigns the field device an IP-address. In this DHCP assignment, the field device is also told the local domain, into which it is signed in, thus, for example, the local domain, "exampleCompany.de". The field device can then, based on such local domain, dynamically produce the cloud name of the cloud server 18. For this, a predetermined name component, such as, for example, "endresscloud" is connected with the local domain name "exampleCompany.de" via a separation dot, in order in such manner to produce the cloud name, "endresscloud.exampleCompany.de". The name component "endresscloud" can be derived, for example, from the cloud name of the public cloud, "endresscloud.com", by omitting the ".com". A given field device 1, 22-1, 22-2 can then use the so produced cloud name, "endresscloud.exampleCompany.de", to request cloud services from the cloud server 18. With this addressing, the cloud name of the private cloud is then converted by means of a DNS server into the IP-address 24 of the cloud server 18.

Figure 4:
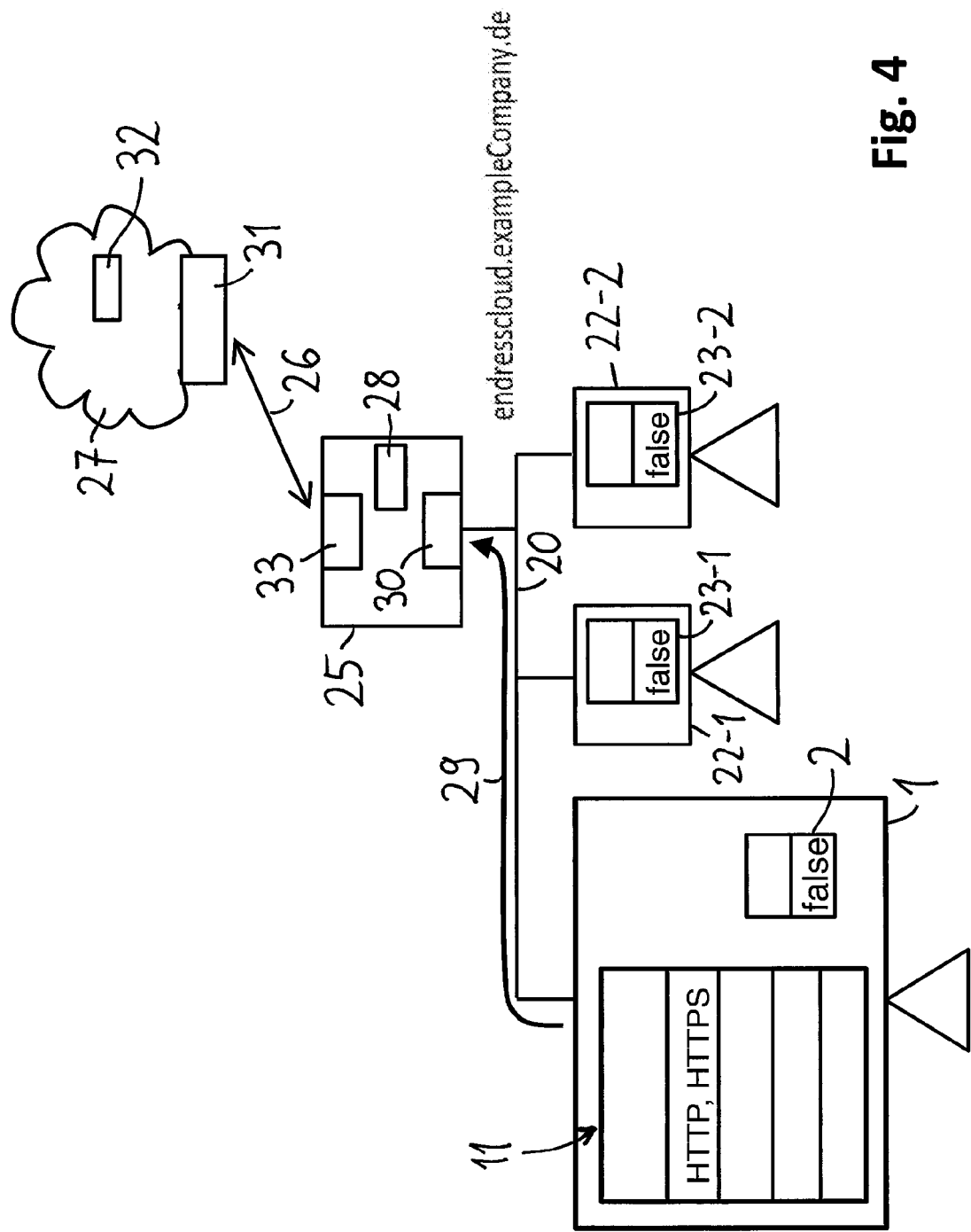
FIG. 4 shows a transfer of cloud data from the field device to a connecting apparatus, which forwards the cloud data to a private cloud.

In the case of the solution shown in FIG. 3, a data memory 21 is provided in the cloud server 18 for storing cloud entries. Shown in FIG. 4 is another example of an embodiment, in the case of which there is connected to the fieldbus 20 a connecting apparatus 25, which is designed to forward to a private cloud 27 cloud data received from a field device via a data connection 26. Connected to the fieldbus 20, such as in the case of the solution shown in FIG. 3, are a plurality of field devices 1, 22-1 and 22-2, each of which has a hardware implemented setting element 2, 23-1, 23-2. These setting elements 2, 23-1, 23-2, are, in each case, set to the value "false", so that for all connected field devices a data transfer mode to the private cloud and, thus, to the connecting device 25, is selected. For producing requests for cloud services, there is provided in each of the field devices 1, 22-1 and 22-2, a protocol stack 11, which is preferably embodied as an HTTP- or HTTPS protocol stack. For example, the field device 1 can produce a request for a cloud service, which is addressed to the cloud name, "endresscloud.exampleCompany.de", of the private cloud. This domain name is converted by the responsible DNS server into the IP-address 28 of the connecting apparatus 25, so that the request for the code service is transferred as shown by the arrow 29 from the field device 1 to the connecting apparatus 25 and is received there by the programming interface 30. The programming interface 30 can be, for example, a local copy of the programming interface 31 of the private cloud 27. Via the programming interface 30, the cloud services of the private cloud 27 can be contacted in the same manner as via the actual programming interface 31 of the private cloud 27. Especially, the interface definition of the programming interface 30 can agree with the interface definition of the programming interface 31. Alternatively thereto, the programming interface 30 of the connecting apparatus 25 could, however, also be embodied differently from the programming interface 31 of the private cloud 27.

The connecting apparatus 25 is embodied to receive from a field device requests for cloud services and to forward such to the private cloud 27. For this, the IP-address 28 of a received request for a code service is replaced by the IP-address 32 of the private cloud 27, wherein the request is transferred from the cloud-client interface 33 of the connecting apparatus 25 via the data connection 26 to the programming interface 31 of the private cloud 27. In the reverse direction, messages and confirmations of the private cloud 27 can be transferred via the programming interface 31, the data connection 26 and the cloud-client interface 33 to the connecting apparatus 25 and from there via the fieldbus 20 to one of the field devices.

Based on FIG. 4, it can be seen that data transfer to a private cloud 27 can also be conducted via a connecting apparatus 25 provided for this, a connecting apparatus 25 which receives the data from a field device and forwards such to the private cloud 27.

Figure 5A:
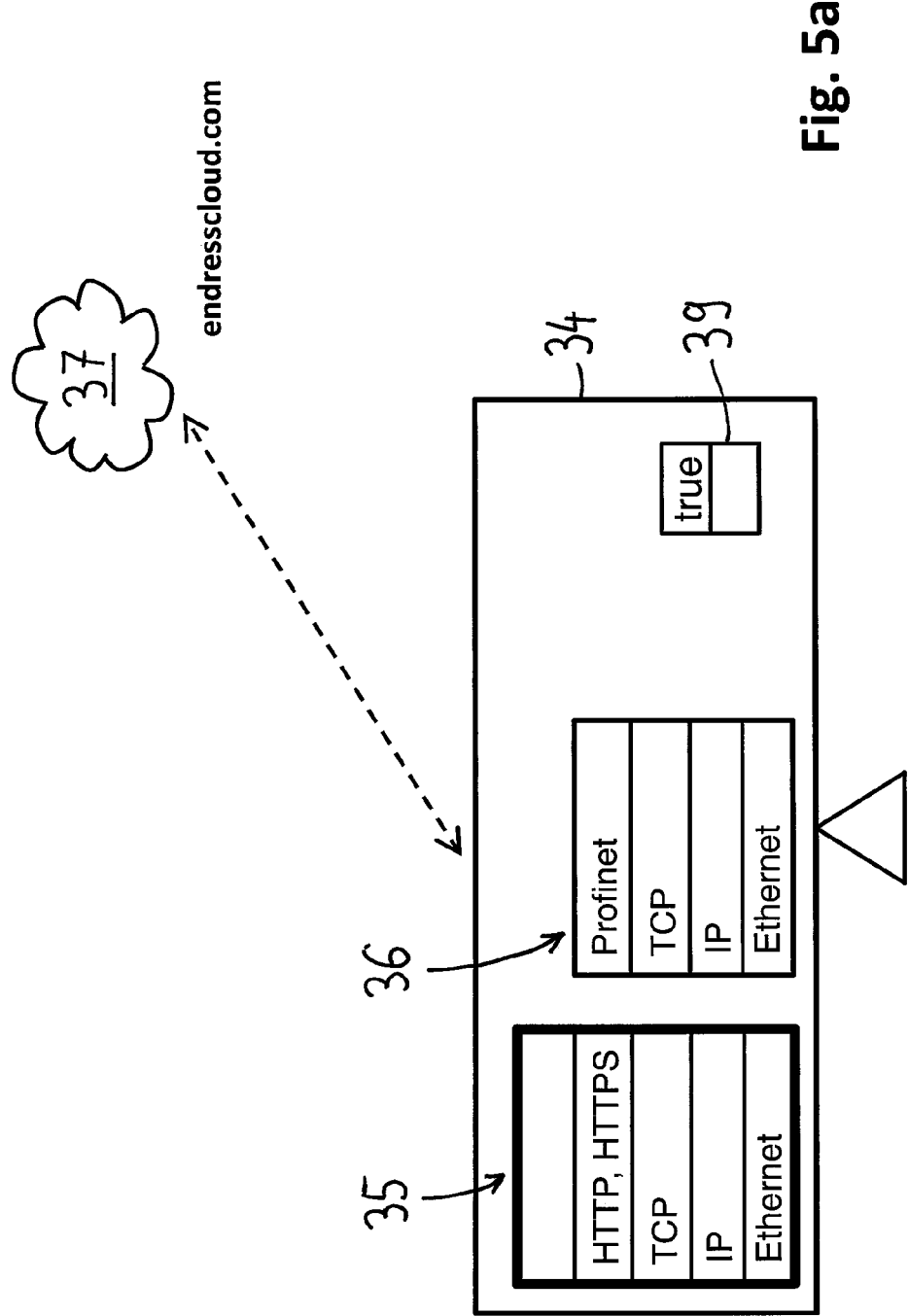
FIG. 5*a* shows a transfer of cloud data to a public cloud, wherein a first protocol stack of the field is selectable for data transfer to the public cloud.
Figure 5B:
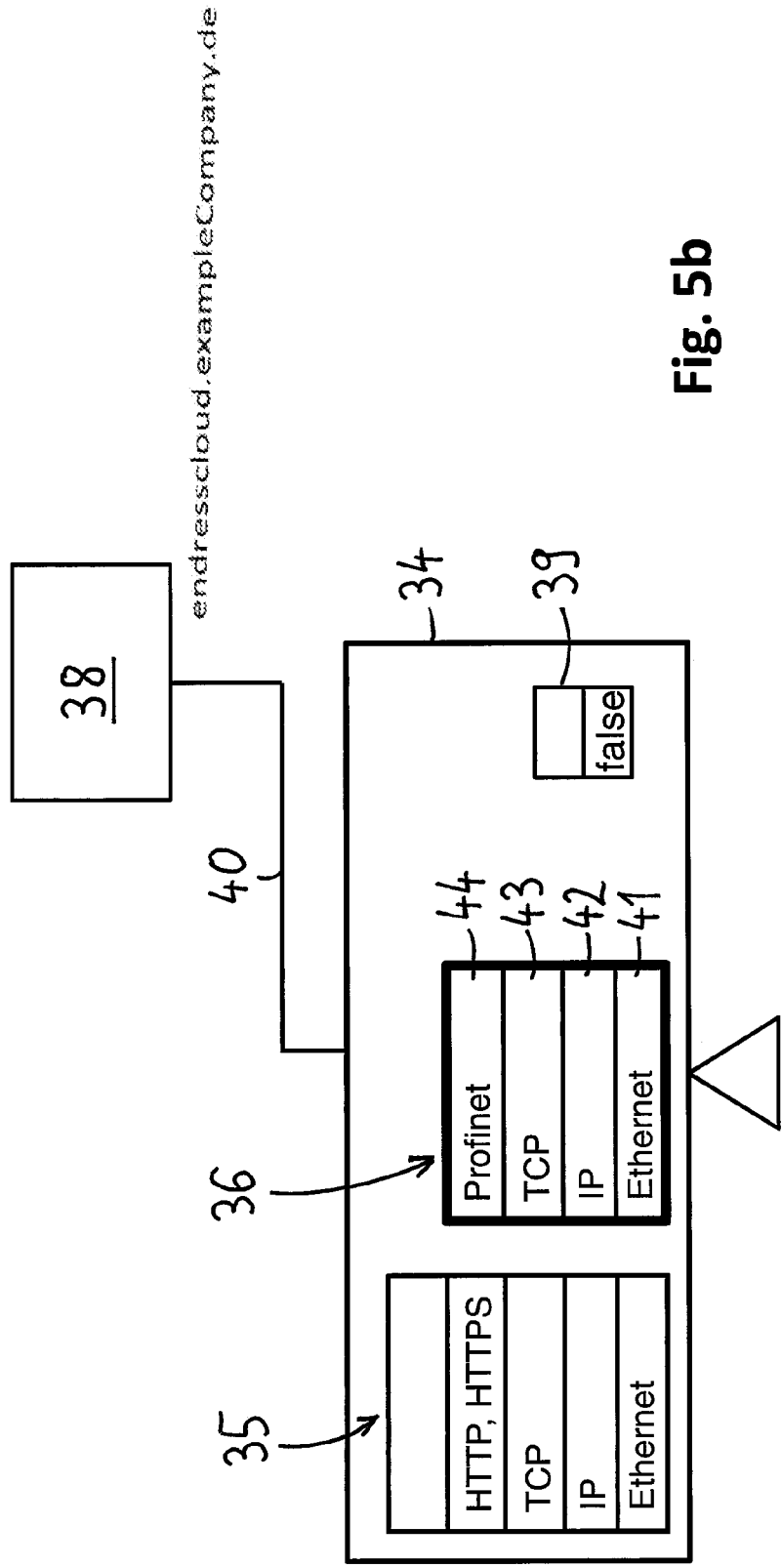
FIG. 5*b* shows a transfer of cloud data to a private cloud, wherein a second protocol stack of the field device is selectable for data transfer to the private cloud.

In the case of the previously discussed Examples, the same protocol stack 11 was applied for the data transfers to the public cloud and to the private cloud. FIGS. 5*a* and 5*b* provide, in contrast, another example of an embodiment, in the case of which a field device 34 has a first protocol stack 35 as well as a second protocol stack 36. In such case, the first protocol stack 35, which preferably is embodied as an HTTP- or HTTPS protocol stack, is used for transferring cloud data to the public cloud 37. The second protocol stack 36, in contrast, which preferably can be embodied as an industrial Ethernet protocol stack, is used for transferring cloud data to the private cloud 38, as shown in FIG. 5*b*.

The field device 34 is provided with a hardware implemented setting element 39 for switching between a data transfer to the public cloud 37 and a data transfer to the private cloud 38. Shown in FIG. 5*a* is the hardware implemented setting element 39 set to the value "true", so that the data transfer to the public cloud 37 is selected. Because of this setting of the setting element 39, it is established that the cloud data are sent to the domain name, "endresscloud-.com", of the public cloud 37. Additionally, the value "true" of the setting element 39 means that the first protocol stack 35 is selected as the protocol stack to be used for the data transfer to the public cloud 37. Protocol stack 35 is preferably an HTTP- or HTTPS protocol stack, so that the database requests are transferred to the public cloud 37 preferably according to the standard, HTTP or HTTPS. In such case, the protocol layers of the first protocol stack 35, when such is designed as an HTTP- or HTTPS protocol stack, correspond to the protocol layers of the protocol stack 11 shown in FIG. 2.

Shown in FIG. 5*b* is the field device 34 again, wherein the setting element 39 is now set to the value "false". Thus, in FIG. 5*b*, the second data transfer mode is selected, in the case of which the cloud data are transferred from field device 34 to the private cloud 38. In such case, the data connection between the field device 34 and the private cloud 38 can occur, for example, via a fieldbus 40. Alternatively, however, a special data connection, for example, a wireless data connection, can be provided between the field device 34 and the private cloud 38. When the setting element 39 is set to the value "false", this means that the cloud name, "endresscloud.exampleCompany.de", is selected as address. Additionally, in the case of the example illustrated in FIG. 5*b*, by setting the setting element 39 to the value "false", the second protocol stack 36 is selected for data transfer to the private cloud 38, wherein the second protocol stack 36 differs from the first protocol stack 35. For the transfer of the cloud data via the fieldbus 40, the second protocol stack 38 can be implemented, for example, as a fieldbus protocol stack, for example, as an industrial Ethernet protocol stack. In the case of the example illustrated in FIG. 5*b*, the second protocol stack 36 is embodied as a Profinet protocol stack and includes an Ethernet layer 41, an IP layer 42, a TCP layer 43 and a Profinet layer 44 arranged on top. Because of the selection of the second protocol 36, the cloud data to be transferred to the private cloud 38 can be transferred via the fieldbus 40 to the private cloud 38. In the case of the solution shown in FIGS. 5*a* and 5*b*, the setting of the hardware implemented setting element 39, thus, not only changes the addressing, but, also, supplementally, selects the suitable one of the two protocol stacks 35, 36, which then is applied for the transfer of the cloud data to the relevant cloud.

The invention claimed is:

1. A field device for registering and/or influencing process variables, the field device comprising:
    a fieldbus interface;
    a first network interface;
    a first protocol stack configured to provide network communication between the field device and a cloud server and to address the cloud server via a domain name; and
    a hardware-implemented setting element selectively settable to a first setting or a second setting, wherein the setting element is a switch element, a switch, a switching element, a dual in-line switch, a configuration element, a plug element, a plug, a jumper, a plug-in jumper, or a short-circuiting plug,
    wherein the field device is designed to:
        set the domain name to a domain name of a public cloud and transfer data to the public cloud when the setting element is set to the first setting; and
        set the domain name to a domain name of a private cloud and transfer data to the private cloud when the setting element is set to the second setting.

2. The field device of claim 1,
    wherein the setting element can be set by mechanical actuation selectively to the first setting or the second setting;
    wherein the setting element is arranged or arrangeable on a printed circuit board of the field device; and
    the setting element is a plug element that can be plugged onto pins of a printed circuit board of the field device.

3. The field device of claim 1,
    wherein the domain name of the public cloud is translatable by means of a name server into an IP-address of the public cloud and the field device is further designed to transfer data to the IP-address of the public cloud when the setting element is set to the first setting; and
    wherein the domain name of the private cloud is translatable by means of a name server into an IP-address of the private cloud and the field device is further designed to transfer data to the IP-address of the private cloud when the setting element is set to the second setting.

4. The field device of claim 1,
wherein the field device is further designed for transferring data to the public cloud using the first protocol stack when the setting element is set to the first setting and for transferring data to the private cloud likewise using the first protocol stack when the setting element is set to the second setting.

5. The field device of claim 1, wherein the first protocol stack is an HTTP- or HTTPS protocol stack.

6. The field device of claim 1, further comprising:
a second protocol stack,
wherein the field device is further designed for transferring data to the public cloud using the first protocol stack and for transferring data to the private cloud using the second protocol stack.

7. The field device of claim 6, wherein the fieldbus component is further designed to switch between the first protocol stack and the second protocol stack.

8. The field device of claim 6, wherein the first protocol stack is an HTTP- or HTTPS protocol stack and the second protocol stack is an industrial Ethernet protocol stack.

9. The field device of claim 1, wherein the field device is further designed to use a predetermined domain name for addressing the public cloud when the setting element is set to the first setting.

10. The field device of claim 1,
wherein the field device is further designed, when the setting element is set to the second setting, to produce the domain name of the private cloud from a predetermined name component and a local domain in which the field device is installed and to ascertain the local domain based on a DHCP assignment received from a DHCP server.

11. The field device of claim 1,
wherein the field device is further designed, when the setting element is set to the second setting, to transfer data to the private cloud via the fieldbus, and
wherein the fieldbus is a fieldbus according to one of the following standards: industrial Ethernet; EtherNet/IP, Profinet, EtherCAT, ModBus TCP, HART-IP, OPC, and OPC-UA.

12. A fieldbus network, comprising;
a fieldbus;
a field device for registering and/or influencing process variables, the field device including:
a fieldbus interface;
a network interface;
a protocol stack configured to provide network communication between the field device and a cloud server and to address the cloud server via a domain name; and
a hardware-implemented setting element selectively settable to a first setting or a second setting, wherein the setting element is a switch element, a switch, a switching element, a dual in-line switch, a configuration element, a plug element, a plug, a jumper, a plug-in jumper, or a short-circuiting plug,
wherein the field device is configured to:
set the domain name to a domain name of a public cloud and transfer data to the public cloud when the setting element is set to the first setting; and
set the domain name to a domain name of a private cloud and transfer data to the private cloud when the setting element is set to the second setting; and
a connecting device connected to the fieldbus or a cloud server connected to the fieldbus.

13. The fieldbus network of claim 12,
wherein the field device is further designed, when the setting element is set to the second setting, to transfer data to the private cloud via the fieldbus and the connecting device, and
wherein the connecting apparatus is designed to forward data received from the field device to the private cloud.

14. The fieldbus network of claim 12, further comprising:
a cloud server connected to the fieldbus, the cloud server including a storage apparatus for storing data received from the field device,
wherein the field device is further designed, when the setting element is set to the second setting, to transfer data to the private cloud via the fieldbus to the private cloud server.

15. A method for transferring data from a field device to a cloud,
wherein the field device includes:
a fieldbus interface;
a network interface;
a protocol stack configured to provide network communication between the field device and a cloud sever and to address the cloud sever via a domain name; and
a hardware-implemented setting element selectively settable to a first setting or a second setting, wherein the setting element is a switch element, a switch, a switching element, a dual in-line switch, a configuration element, a plug element, a plug, a jumper, a plug-in jumper, or a short-circuiting plug, and
wherein the field device is designed to:
set the domain name to a domain name of a public cloud and transfer data to the public cloud when the setting element is set to the first setting, and
set the domain name to a domain name of a private cloud and transfer data to the private cloud when the setting element is set to the second setting,
the method comprising:
setting the setting element of the field device to a first setting or to a second setting;
setting the domain name to the domain name of the public cloud and transferring data to the public cloud when the setting element is set to the first setting; and
setting the domain name to the domain name of the private cloud and transferring data to the private cloud when the setting element is set to the second setting.

* * * * *